Nov. 22, 1932.　　　W. J. SANDMAN　　　1,888,890
BATTERY CONTAINER
Filed March 22, 1930　　　2 Sheets-Sheet 1

Inventor
W. J. Sandman
By Mason Fenwick & Lawrence
Attorneys

Nov. 22, 1932. W. J. SANDMAN 1,888,890
BATTERY CONTAINER
Filed March 22, 1930  2 Sheets-Sheet 2
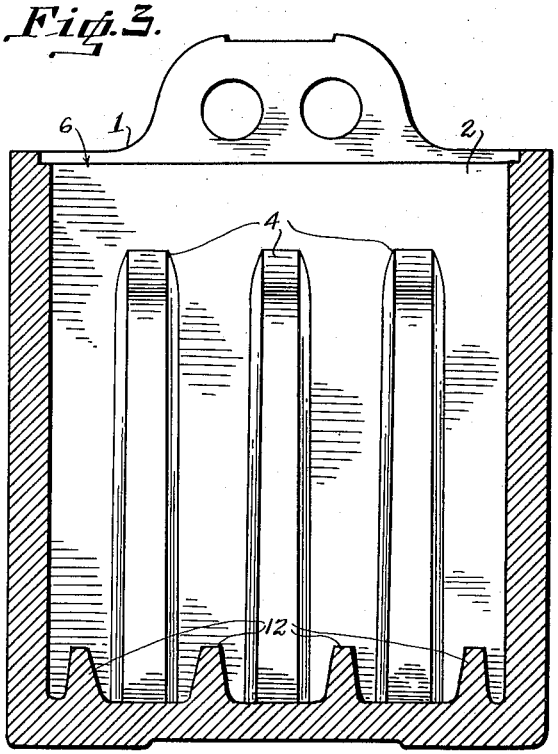
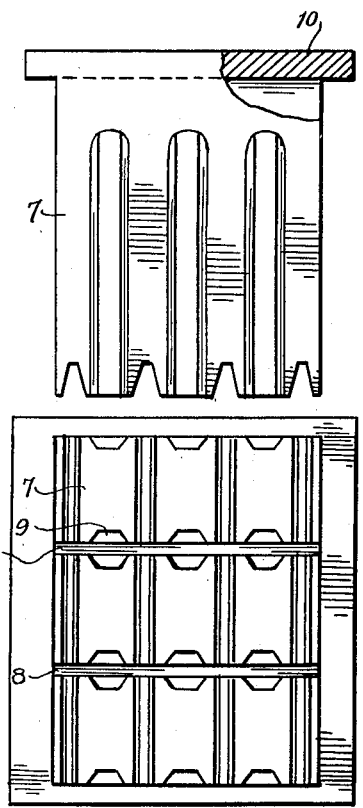
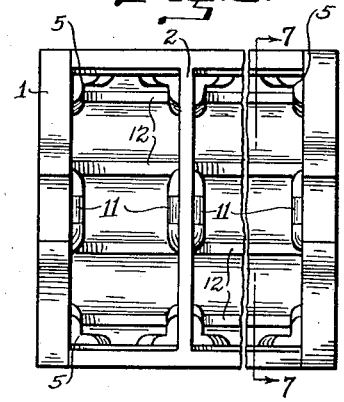
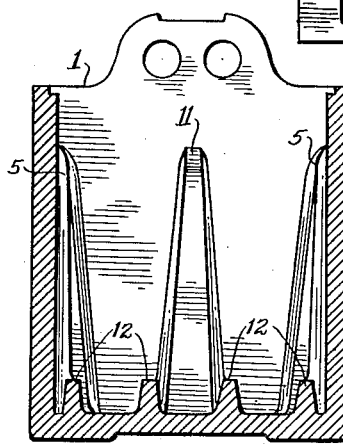
Inventor
W. J. Sandman
By Mason Fenwick & Lawrence
Attorneys Patented Nov. 22, 1932

1,888,890

UNITED STATES PATENT OFFICE

WILLIAM J. SANDMAN, OF LOUISVILLE, KENTUCKY

BATTERY CONTAINER

Application filed March 22, 1930. Serial No. 438,225.

This invention relates to battery containers, and has for its principal object the provision of a battery container, the electrolyte chambers or cells of which are larger than are necessary to contain the body of plates inserted therein or which are to be so inserted, in which the unnecessary clearance or space between the cell walls and the plates is intersected at advantageous positions by ribs or pilasters against which the inserted plate units are adapted to make a snug fit.

The invention is particularly adapted to the manufacture of replacement batteries which are to take the place of batteries originally provided in automobiles, and which must therefore, be of the same standard outside dimensions as those of the batteries originally furnished with the automobiles so as to fit in the battery compartments forming part of said automobiles.

The tendency in replacement batteries is to reduce the cost as well as lighten their weight and thus minimize distribution charges. Consequently, the idea was developed to manufacture batteries with thinner or fewer plates per cell than in the original batteries. In order to make these smaller plate units fit within the container, it is ordinarily necessary to make the cells narrower and this coincidentally reduces the size of the batteries. Reduction in the battery size is objectionable in making the battery look cheap as well as in the objection above noted, that it will not fit the automobile compartment for which a larger size battery container was originally provided.

Manufacturers have hitherto, in part overcome this difficulty in one of two ways, either by making the walls of the battery container very thick so that while it retains the same outside dimensions as the original standard battery for which it is designed as a replacement, the cell spaces are made small enough to snugly receive the plate units. The other expedient was to provide a battery container of standard size inside and out and to fill the waste space at the sides of the smaller plate units with wooden separators.

Both of the above recourses are expensive and the idea of the present invention is to overcome all the difficulties encountered in the previous expedients and to provide certain positive advantages over what has heretofore been accomplished.

Another object of the invention is to provide a battery container of standard outside dimensions and having standard large size chambers or cells, in combination with smaller plate units, the walls of said cells being formed with means snugly abutting the plate units and occupying as little of the space between said plate unit and cell walls, as possible, so as to provide for a maximum volume of the electrolyte.

Still another object of the invention is to strengthen the walls of the container by the provision of inside reinforcing ribs on the walls of the cells.

Another object of the invention is the possibility of decreasing the weight and therefore, the transportation charges of the battery by minimizing the quantity of material in the construction of the container, while at the same time maintaining the standard external dimensions of the container.

Other objects of the invention will appear as the following description of an illustrative embodiment thereof proceeds.

In the drawings accompanying the following specification, in which the same characters of reference have been used throughout the several figures to denote identical parts:

Figure 3 is a cross-section taken along the line 3—3 of Figure 2;

Figure 4 is a view in elevation partly in section of a core for moulding the inside of the container;

Figure 5 is a bottom plan view of the core;

Figure 6 is a plan view of a modified form of container, part being omitted; and Figure 7 is a cross-section taken along the line 7—7 of Figure 6.

Figure 1:
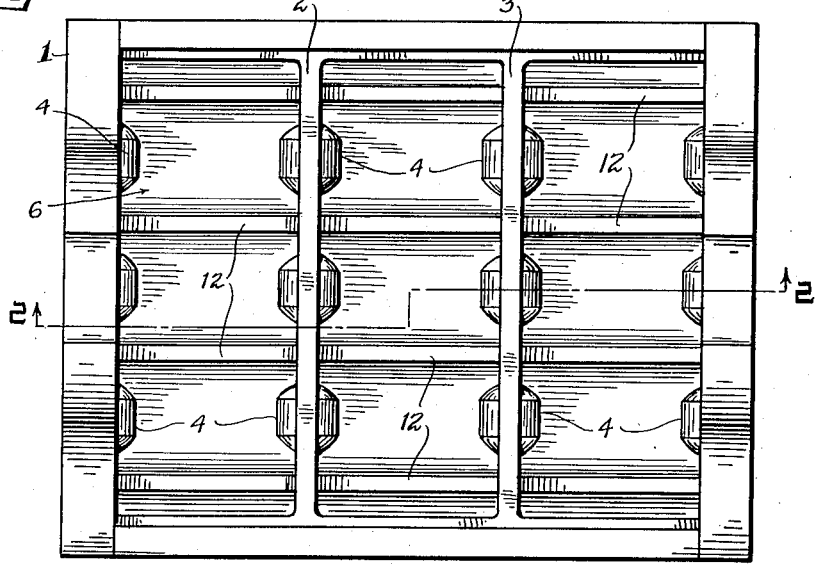
Figure 1 is a plan view of a battery container embodying the principles of the present invention.
Figure 2:
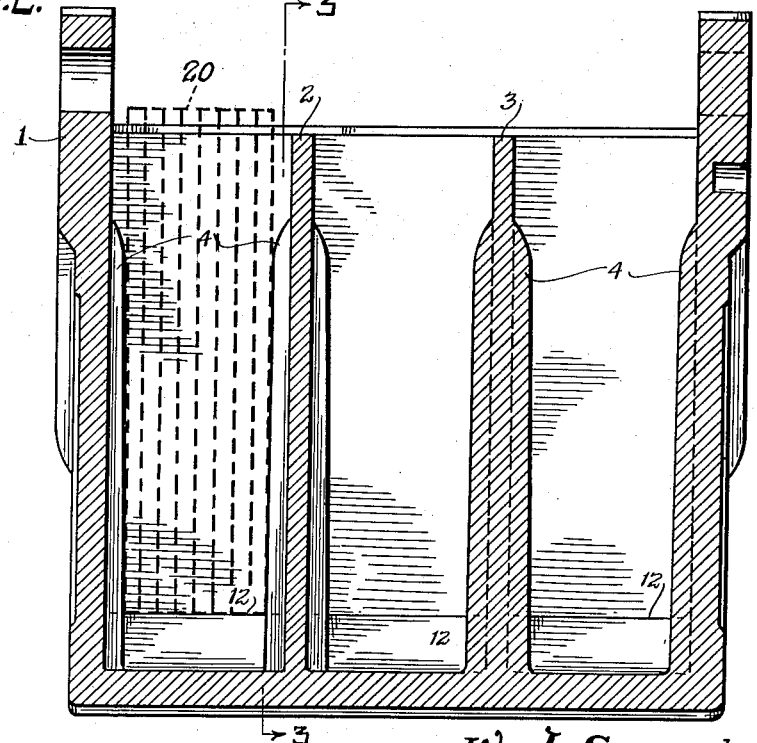
Figure 2 is a longitudinal vertical section taken along the line 2—2 of Figure 1 showing in broken lines a plate group at 20.

Referring now in detail to the several figures, and first adverting to that form of the invention shown in Figures 1, 2 and 3, the numeral 1 represents in general the battery container which may be made as is usual, of any desired mouldable substance. The container 1 is provided with transverse vertical partitions 2 and 3 moulded integrally with the container as is usual in storage batteries, said partitions forming cells for the reception of the plate units, the latter resting upon integrally moulded base ridges 12 in a manner well known.

The container as thus far described, may be of standard dimensions and the partitions spaced away from one another a standard distance so that the cells are of standard width. A battery container thus made will fit into the automobile compartment provided for the reception of the standard sized battery which the present container is designed to replace. It is contemplated however, to use a smaller number of plates in each unit or the same number of thinner plates or a smaller number of thinner plates than is usually provided in the original battery.

Without the exercise of the present invention, the plate units would be considerably too small for the cells, would not make a snug fit therein, and would be subject to jarring and displacement so that their life would not be long.

The present invention contemplates the moulding of ribs 4 on the inside walls of the battery as well as on opposite sides of the partitions 2 and 3. The location of these ribs as well as their number is a matter of choice. Three are here shown in the drawings, although one or any other number of ribs might be used to advantage. In order to permit withdrawal of the mould, the ribs are substantially parallel or preferably are slightly tapered from the base upwardly.

It is ordinarily not essential that the plate units be braced or supported edgewise of the plates although if such construction is desired, the ribs may be formed at the corners of the cell, each rib being angularly recessed as indicated at 5 in Figure 6 to receive the corner of the plate unit. By this means, not only are the plates constricted widthwise but also held edgewise, thus preventing any vibration and relative movement between the plates and the container.

It is, of course, obvious that not only do the ribs 4 provide projecting stays or supports for the plate units, but they also reinforce and strengthen the partition walls as well as the sides of the battery container, so that the latter can be made of thinner material and a corresponding saving in the cost of construction effected. The ribs 4 also provide between them, spaces 6 enabling the cells to hold a greater quantity of electrolyte and thus increasing their life and capacity.

A mould suitable for making the battery container shown in Figures 1, 2 and 3 is illustrated in Figures 4 and 5, the mould 7 representing a solid body having vertical spaces 8 for moulding the partitions, said spaces and the end portions of the solid body being provided with vertical grooves 9 in which the ribs are moulded. The solid body is made in several parts, one for each cell, these being connected by a transverse frame or supporting lever 10. This mould is merely exemplary of any practical form of mould by which a battery container may be constructed.

In Figures 6 and 7, a modification is shown in which the ribs are inwardly flared toward the base, so that while the upper ends of the ribs afford a convenient centering means for the insertion of the plate unit, as said unit is lowered, it comes into more intimate contact with the surfaces 11 of the ribs so that when it finally reaches its position of repose upon the base ridges 12, it is quite snugly constricted by the surfaces of said ribs and thus firmly held against vibration or displacement.

It is to be understood that the invention is not limited to the specific form or arrangement of ribs shown but that the invention contemplates the provision of a battery container in which the plate units are supported by integrally moulded ribs extending from the side walls of the cells.

What I claim is:

An integral battery container of solid inflexible composition having partitions constituting with the sides, ends and bottom of said container, cells, plate groups of less thickness than the width of said cells with the faces of the plates thereof substantially parallel to the partitions and ends of said container, said partitions and ends being formed with inflexible ribs having faces snugly engaging the faces of the outside plates of said groups.

In testimony whereof I affix my signature.

WILLIAM J. SANDMAN.